United States Patent [19]

Chalard et al.

[11] Patent Number: 4,731,612

[45] Date of Patent: Mar. 15, 1988

[54] METHOD AND APPARATUS FOR ELIMINATING SHORT PULSES IN A DOPPLER RADAR

[75] Inventors: Claude A. Chalard, Montigny Le Bretonneux; Christian F. H. Trilles, Velizy-Villacoublay, both of France

[73] Assignee: Laboratoire Central de Telecommunications, Velizy Villacoublay, France

[21] Appl. No.: 588,935

[22] Filed: Jan. 27, 1984

[30] Foreign Application Priority Data

Jan. 28, 1983 [FR] France ................................ 83 01323

[51] Int. Cl.$^4$ ........................... G01S 7/30; G01S 7/44
[52] U.S. Cl. ...................................... 342/94; 342/194
[58] Field of Search ............ 343/5 CF, 5 NQ, 5 VQ, 343/7 A, 17.2 PC; 342/93, 194, 195, 94

[56] References Cited

U.S. PATENT DOCUMENTS

| 4,070,673 | 1/1978 | Schmidt et al. | 342/90 |
| 4,132,990 | 1/1979 | Di Domizio et al. | 342/89 |
| 4,489,320 | 12/1984 | Lewis et al. | 342/94 |

Primary Examiner—T. H. Tubbesing
Assistant Examiner—Gilberto Barrón, Jr.
Attorney, Agent, or Firm—Cushman, Darby & Cushman

[57] ABSTRACT

A doppler radar arrangement that is able to reject short pulses. It does so by comparing the modulus of a difference vector with the same parameter during the preceding PRI. Information corresponding to "No short pulse" or to "Short pulse detected" is stored during each pulse repetition interval. The short pulse signal is replaced by the preceding signal in the same range gate only once by comparing the stored information relating to the current $i^{th}$ PRI and to the preceding $i-1^{th}$ and $i-2^{th}$ PRI.

3 Claims, 4 Drawing Figures

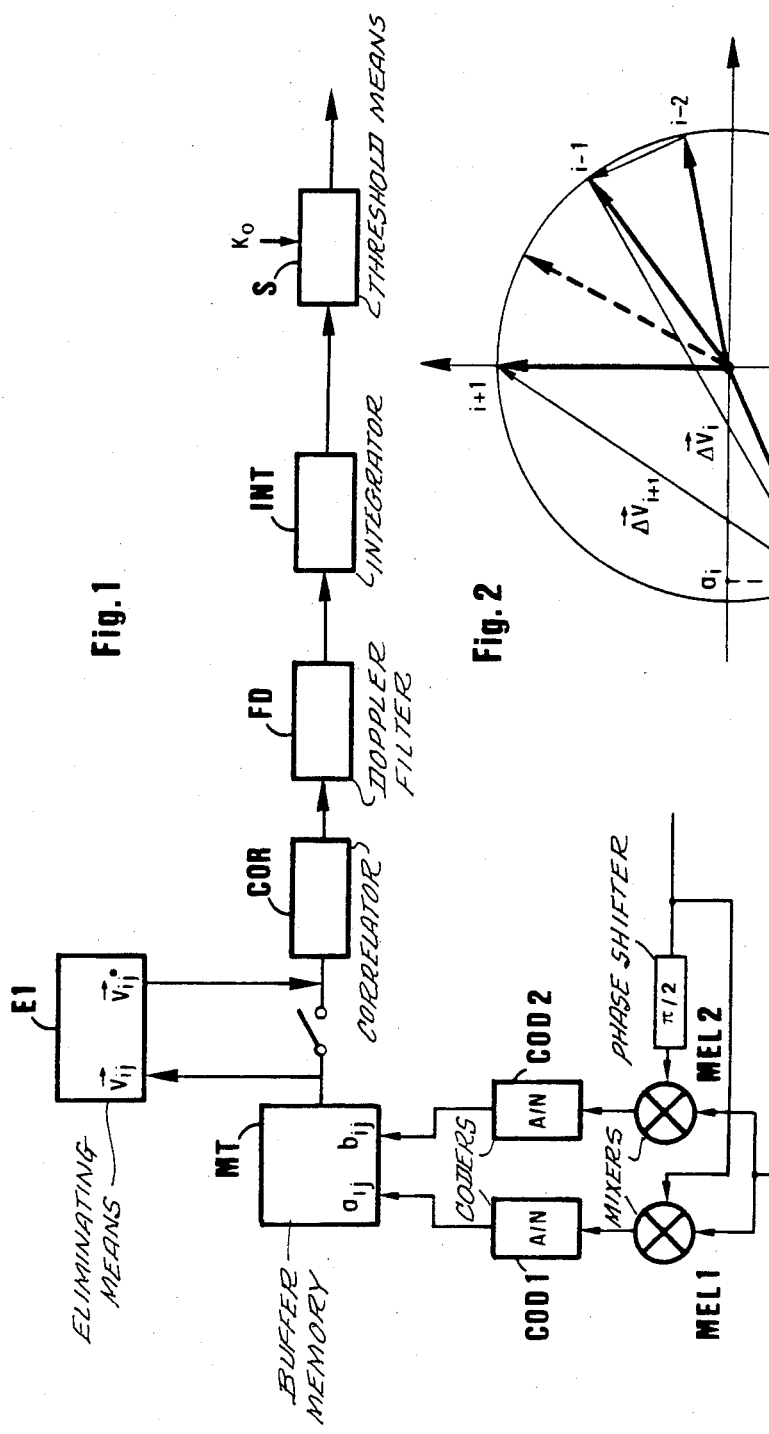
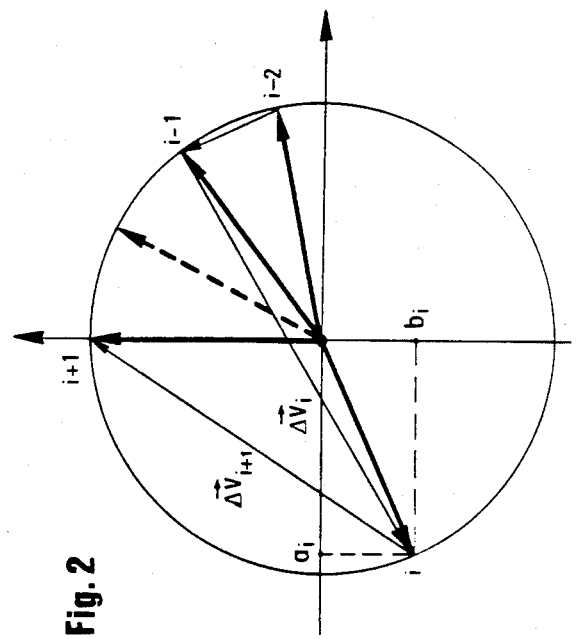
Fig. 1
Fig. 2

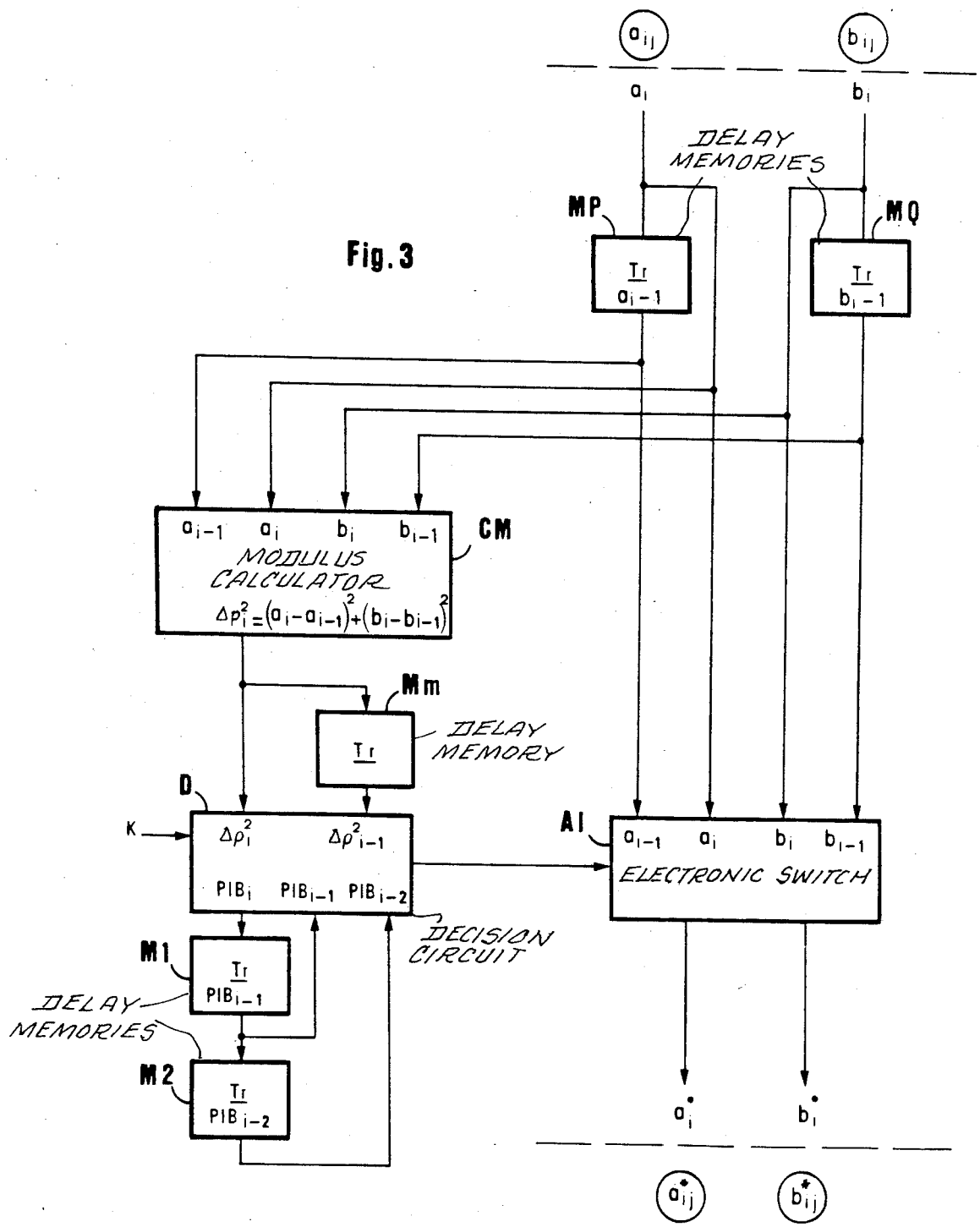

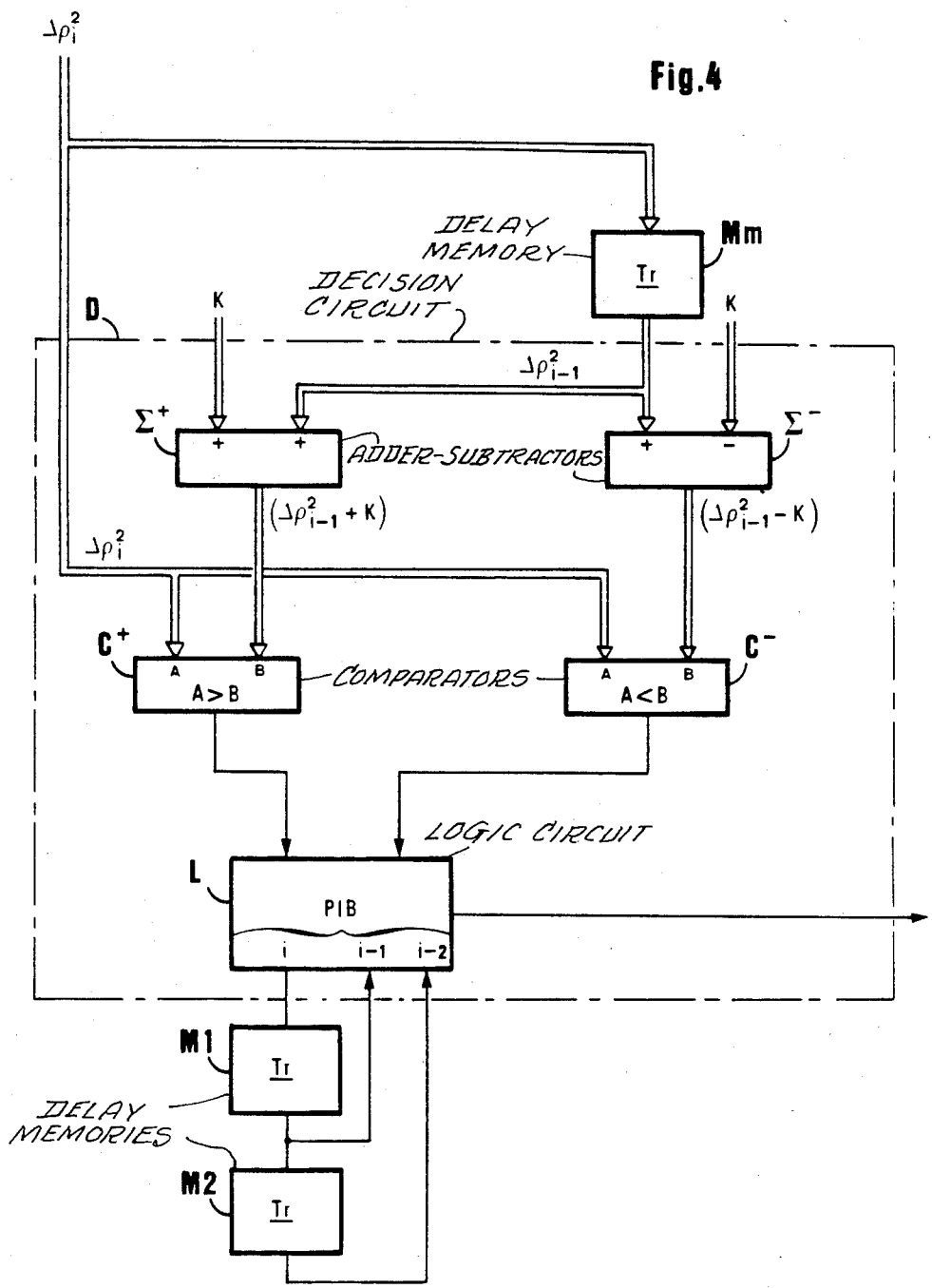

METHOD AND APPARATUS FOR ELIMINATING SHORT PULSES IN A DOPPLER RADAR

BACKGROUND OF THE INVENTION

The present invention is directed to an apparatus and method for eliminating short pulses in a Doppler radar, whether or not the pulses are pulse compressed.

In radars intended for the detection and location of ground mobile vehicles, it is necessary to operate in short and spaced sound strokes in order to reduce the probability of destruction by an anti-radiation missile and to reduce its susceptibility to counter-measures. The echoes of a target vehicle must be detected and localized very rapidly. This requires the provision of automatic means to avoid a radar operator being subjected to many false alarms coming from the residue of clutter and from active or passive interference signals. This indispensable automatic control of the amount of false alarms should take into account the particular nature of the targets and the characteristics of various stray current signals that may exist.

A false alarm is caused by the presence, in a resolution cell of the radar, of a stray current signal exceeding the previously established threshold of detection. This stray current signal can arise, either from a stray current echo from an exterior source, or from a range sidelobe due to pulse compression and resulting from the presence of a useful signal of a significant level in a resolution cell near the resolution cell in which the stray current signal manifests itself.

The presence of a short pulse, i.e., present only in a given range gate, involves the appearance in the treatment (signal processing) chain of the signal, Doppler filter and integrator, of a transient state corresponding to a pulse response of the chain. For an amplitude of stray current signal more than twenty decibels above the normal noise of the radar, this transient state is detected and causes a false alarm. In the presence of strong fixed echoes, or normal noise, this false alarm causes a degradation of the radar's elimination capability, which reduces its operational usefulness.

SUMMARY OF THE INVENTION

To avoid this transient state, it is appropriate after having detected it, to eliminate this short pulse before its introduction into the treatment chain of the signal and to replace it, for example, by the information present during the preceding repetition. The suppression of this signal, of very brief duration compared to the time of observation, does not affect the quality of the measurement.

The present invention therefore provides a process for detecting these short pulses and a device using this process. The device is placed at the input of the treatment chain of the signal. It operates to detect and eliminate short pulse and replace it by information present in the same range gate during the preceding repetition.

According to the present invention, the process for the elimination of a short pulse consists, successively for each of $j=1$ to N range gates given a repetition period, of index i, to delay the non-delayed components $a_{ij}$ and $b_{ij}$, of the sample $\vec{V}_{ij}$, of the vector signal $\vec{V}_i(t)$, associated with the range gate having index j of the $i^{th}$ period of repetition, of the duration Tr of the repetition period; to calculate starting with preceding delayed components $a_{i-1\,j}$ and $b_{i-1\,j}$ and non-delayed components $a_{ij}$ and $b_{ij}$, the square of the modulus $\Delta\rho_{ij}^2$ of the vector difference $\Delta\vec{V}_{ij}=\vec{V}_{ij}-\vec{V}_{i-1\,j}$; to delay this square of the modulus $\Delta\rho_{ij}^2$ of the duration Tr of the repetition period; and to compare the square of the non-delayed modulus $\Delta\rho_{ij}^2$ with the square of the delayed modulus $\Delta\rho_{i-1\,j}^2$. If the relation $\Delta\rho_{i-1\,j}^2 - K \leq \rho_{ij}^2 \leq \Delta\rho_{i-1\,j}^2 + K$ is satisfied, K being a measurement noise threshold, then one stores the information "no short pulse" $PIB_{ij}=0$ and one delays twice the duration Tr of the repetition period, this information "no short pulse". One transmits finally the non-delayed components $a_{ij}$ and $b_{ij}$. If this relationship is not satisfied, one tests from the very first the two preceding information $PIB_{i-2\,j}$ and $PIB_{i-1\,j}$. Now if $PIB_{i-2\,j}=0$ and $PIB_{i-1\,j}=0$ one stores the information "short pulse detected" $PIB_{ij}=1$ and one transmits the delayed components $a_{i-1\,j}$ and $b_{i-1\,j}$. If $PIB_{i-2\,j}=0$ and $PIB_{i-1\,j}=1$, one stores the information "short pulse detected" $PIB_{ij}=1$ and one transmits the components $a_{ij}$ and $b_{ij}$. If $PIB_{i-2\,j}=1$ and $PIB_{i-1\,j}=1$, one stores the information "no short pulse detected" $PIB_{ij}=0$ and one transmits the components $a_{ij}$ and $b_{ij}$.

BRIEF DESCRIPTION OF THE DRAWINGS

The invention will be further explained by the following description with reference to the attached drawings wherein:

FIG. 1 is a block diagram of a treatment chain of the radar signal (receiver signal processor) including a means for eliminating short pulses in accordance with the invention;

FIG. 2 is a vector diagram explaining the principle of jamming elimination as it applies to the present invention;

FIG. 3 is a block diagram of the means for eliminating short pulses in accordance with the present invention; and FIG. 4 is a more detailed block diagram of block D of FIG. 3.

DETAILED DESCRIPTION OF THE PREFERRED EMBODIMENT

Referring now to FIG. 1, there is shown a block diagram of the treatment chain including a correlator COR, a Doppler filter FD, an integrator INT, or integrator detector, and a system S operating at a threshold $k_0$. To eliminate false alarms caused by short pulses, a means of elimination EI of the short pulses is provided at the input of this treatment chain of the signal. This means of elimination of short pulses according to the present invention receives, from a buffer memory MT, the components $a_{ij}$ and $b_{ij}$ of the sample $\vec{V}_{ij}$, of the signal vector received, at the time $t_{ij}$, in the range gates of index j in the course of the $i^{th}$ repetition period. The sampling and the coding of these received signal vectors $\vec{V}_i(t)$ are obtained by the coders COD1 and COD2, respectively, of the phase channel and of the quadrature channel. These coders receive from the outputs of mixers MEL1 and MEL2, respectively the components $a_i(t)$ and $b_i(t)$ of this analog video signal $\vec{V}_i(t)$.

The principle of this jamming elimination can be understood using the vector diagram of FIG. 2. For a range gate, of index j, this index being, to simplify the notations, omitted in this Figure, one has represented the samples $\vec{V}_{i-2\,j}$, $\vec{V}_{i-1\,j}$, $\vec{V}_{ij}$ and $\vec{V}_{i+1\,j}$, noted $i-2$, $i-1$, $i$ and $i+1$, of the signal vectors $\vec{V}_{i-2}(t)$, $\vec{V}_{i-1}(t)$, $\vec{V}_i(t)$ and $\vec{V}_{i+1}(t)$ received in the course of successive repetition periods $Tr_{i-2}$, $Tr_{i-1}$, $Tr_i$ and $Tr_{i+1}$. At each repetition period, and in particular for the range gate j, one calculates the square of the modulus $\Delta\rho_{ij}^2 = (a_{ij} - a_{i-1\,j})^2 + (b_{ij} - b_{i-1\,j})^2$ of the vector difference $\Delta\vec{V}_{ij} = \vec{V}_{ij} - \vec{V}_{i-1\,j}$. Taking into account the speed of rotation of the antenna and the beamwidth in bearing, the amplitude modulation of parameter $\Delta\rho_{ij}^2$ is very slow. That means that one can consider this parameter as being practically constant from one recurrence to the next.

For a given range gate, of index j, this index being omitted to simplify the notations, the criterion of detection of a short pulse selected is the following:

(a) If the parameter $\Delta\rho_i^2$ is such that the relationship $\Delta\rho_{i-1}^2 - K \leq \Delta\rho_i^2 \leq \Delta\rho_{i-1}^2 + K$ is satisfied, K being a measurement noise threshold, then one can state that there is no short pulse and one performs the following operations:

storing the squared modulus $\Delta\rho_i^2$ in place of the delayed squared modulus $\Delta\rho_{i-1}^2$;

storing the information "no short pulse" or $PIB_i = 0$;

introducing the components $a_i$ and $b_i$ of vector $\vec{V}_i$, in fact $\vec{V}_{ij}$, in the treatment chain of the signal, (b) If the parameter $\Delta\rho_i^2$ is such that the preceding relationship is not satisfied, or that one or the other of the relationships $\Delta\rho_i^2 > \Delta\rho_{i-1}^2 + K$ or $\Delta\rho_i^2 < \Delta\rho_{i-1}^2 - K$ is satisfied, short pulses may exist and one tests the states of preceding binary elements PIB:

if $PIB_{i-2} = 0$ and $PIB_{i-1} = 0$, then the two preceding repetitions do not contain any short pulse; and one would then perform the following operations:

storing the squared modulus $\Delta\rho_i^2$ in place of the delayed squared modulus $\Delta\rho_{i-1}^2$;

storig the information "short pulse detected", or $PIB_i = 1$;

introducing delayed components $a_{i-1}$ and $b_{i-1}$ of the vector $\vec{V}_{i-1}$, by replacing components $a_i$ and $b_i$ of the vector $\vec{V}_i$, in the treatment chain of the signal.

if $PIB_{i-2} = 0$ and $PIB_{i-1} = 1$, then the preceding repetition contains, only, a short pulse; and one would perform the following operations:

storing the squared modulus $\Delta\rho_i^2$ in place of the delayed squared modulus $\Delta\rho_{i-1}^2$;

storing the information "short pulse detected", or $PIB_i = 1$;

introducing components $a_i$ and $b_i$ of the vector $\vec{V}_i$ in the treatment chain of the signal, if $PIB_{i-2} = 1$ and $PIB_{i-1} = 1$, then the two preceding repetitions already contain an effect of a short pulse on the associated squared modulus; then one would perform the following operations:

storing the squared modulus $\Delta\rho_i^2$ in place of the delayed squared modulus $\Delta\rho_{i-1}^2$;

storing the information "no short pulse detected", or $PIB_i = 0$;

introducing components $a_i$ and $b_i$ of the vector $\vec{V}_i$ in the treatment chain of the signal.

These operations will be carried out for each of the successive range gates of a given repetition period, or for all the possible values of j.

The device which operates to eliminate a short pulse according to the above process is described with reference to FIG. 3. The device includes a delay memory MP for an in phase component $a_{ij}$ and a delay memory MQ for a quadrature phase component $b_{ij}$. The delay Tr introduced by these memories is exactly equal to the duration Tr of the repetition period of the radar. To simplify, we will only consider here the treatment effected in the range gate of index j and in the course of the repetition period of index i considered, it being understood that the treatment of various components received in the various range gates is effected successively, from the gate $j = 0$ to the gate $j = N$, using the same material. The use of internal memories MP, MQ, Mm, M1 and M2 which introduce delays Tr equal to the duration of the repetition period permits a change of the repetition period while preserving the same range gate. Thus, all indices j relating to a particular range gate have been suppressed in the FIG. 3 arrangement and the description of this Figure will relate only to this range gate without doing harm to the generality of the treatment.

An electronic switch AI receives finally the components $a_i$ and $b_i$ provided at the input of memories MP and MQ as well as the delayed components $a_{i-1}$ and $b_{i-1}$ provided by these memories. This electronic switch AI transmits then, either the received components $a_i$ and $b_i$, or the delayed components $a_{i-1}$ and $b_{i-1}$ following the state of its input control. The decision of validation of one or the other of these pairs of components is carried out starting with the calculation of the squared modulus $$\Delta\rho_i^2 = (a_i - a_{i-1})^2 + (b_i - b_{i-1})^2$$

of the vector difference $\Delta\vec{V}_i = \vec{V}_i - \vec{V}_{i-1}$. This squared modulus is obtained by a calculator of modulus CM receiving the components $a_i$ and $b_i$ of vector $\vec{V}_i$ and the delayed components $a_{i-1}$ and $b_{i-1}$ of vector $\vec{V}_{i-1}$. This calculation can be carried out for example by two first binary adder-subtractors effecting, respectively, the operations $(a_i - a_{i-1})$ and $(b_i - b_{i-1})$ followed each by a programmable memory, preferably a PROM, permitting to effect a rise to the square. These memories are then followed by a third binary adder-subtractor effecting the summation of the output variables $(a_i - a_{i-1})^2$ and $(b_i - b_{i-1})^2$ of these two memories.

When starting with this squared modulus $\Delta\rho_i^2$ the decision circuit D will command the electronic switch AI. A delay memory Mm of this squared modulus is moreover interposed between the calculator of the modulus CM and this decision circuit D and provides the delayed squared modulus $\Delta\rho_{i-1}^2$. The delay introduced by this delay memory is equal to the duration of the repetition period Tr.

When starting with received squared modulus $\Delta\rho_i^2$ and delayed squared modulus $\Delta\rho_{i-1}^2$ this decision circuit elaborates its output variable, but it can only do it after having tested the information "no short pulse" or preceding PIB. These PIB informations are elaborated by the decision circuit D. A first delay memory M1 of this PIB information provides to this decision circuit the delayed $PIB_{i-1}$ information starting with the $PIB_i$ information which has been furnished to it one instant $t - Tr$ sooner. A second delay memory M2 of this PIB information provides to this decision circuit the twice delayed $PIB_{i-2}$ information starting from the received $PIB_{i-1}$ delayed information of the first delay memory MI.

A more detailed block diagram of this decision circuit D is shown in FIG. 4, showing also a treatment relating to the range gate of index j and by not showing this index on the figure. This decision circuit has two adder-subtractors $\Sigma+$ and $\Sigma-$ receiving on the one hand the delayed squared modulus $\Delta\rho_{i-1}^2$ and on the other hand the constant K, K being a measurement noise threshold. These adder-subtractors effect respectively the sum $(\Delta\rho_{i-1}^2 + K)$ and the difference $(\Delta\rho_{i-1}^2 - K)$ and provide respectively this sum and this difference to the inputs B of first and second comparators C+ and C−.

The inputs A of this first and this second comparators receive the squared modulus $\Delta\rho_i^2$ provided by the calculator of modulus CM (FIG. 3). If the squared modulus $\Delta\rho_i^2$ furnished is greater than the quantity $(\Delta\rho_{i-1}^2+K)$, the first comparator C+ will furnish on its output A>B a binary element at logic level 1. If the squared modulus $\Delta\rho_i^2$ furnished at the input A of comparator C− is lower than the quantity $(\Delta\rho_{i-1}^2-K)$ this second comparator C− will furnish at its output A<B a binary element at logic level 1. The outputs of first and second comparators C+ and C− are furnished to a logic circuit L which tests whether one or the other of these outputs is at logic level 1 and, in this case, to test also the state of the test delayed binary element of short pulse $PIB_{i-1}$ furnished by the first memory M1 and twice delayed binary element $PIB_{i-2}$ furnished by the second memory M2.

Each of memories MP and MQ should be able to store as many memory words, $a_{ij}$ or $b_{ij}$ as these are range gates cut off based on the duration of the repetition period of the radar. The number of binary elements that have these memory words will depend from the step of numerization of the components $a_{ij}$ and $b_{ij}$ chosen. The calculator of modulus CM furnishes to the memory modulus Mm the successive values of squared modulus $\Delta\rho_{ij}^2$ of the vector difference $\Delta\vec{V}_{ij}=\vec{V}_{ij}-\vec{V}_{i-1\,j}$. It will be the same for this memory which should also be able to store as many memory words as there are range gates. The first and second memories M1 and M2 contain the binary elements $PIB_{ij}$. They must be able to contain as many binary elements as there are range gates.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

We claim:

1. A method for eliminating short pulses in a pulse Doppler radar, the pulse repetition period of which is divided into N range gates, comprising the steps of:

delaying components $a_{ij}$ and $b_{ij}$ of a sample $\vec{V}_{ij}$ of the received signal vector by a time delay equal to the duration Tr of the repetition period, where i and j are sub-indices designating the $i^{th}$ repetition period and the $j^{th}$ range gate of the latter period;

determining the vector $\Delta\vec{V}_{ij}=\vec{V}_{ij}-\vec{V}_{i-1\,j}$, which is the difference between the received signal vector and the signal vector received in the same range gate during the preceding repetition period, by calculating the square $\Delta\rho_{ij}^2$ of the modulus of said vector $\Delta\vec{V}_{ij}$ from the components $a_{ij}$ and $b_{ij}$ and the preceding delayed components $a_{i-1\,j}$ and $b_{i-1\,j}$;

delaying the squared modulus $\Delta\rho_{ij}^2$ by the duration Tr of a repetition period;

comparing the squared modulus and the delayed squared modulus $\Delta\rho_{i-1\,j}^2$ corresponding to the preceding repetition period and determining whether they satisfy the inequalities $$\Delta\rho_{i-1\,j}^2-K\leq\Delta\rho_{ij}^2\leq\Delta\rho_{i-1\,j}^2+K$$

where K is a measurement noise threshold;

storing information indicative of "No short pulse" if the inequalities are satisfied;

if the inequalities are not satisfied, storing information corresponding to "Short pulse detected" when the information corresponding to the $i-2^{th}$ repetition period is "No short pulse" and information corresponding to "No short pulse" when the information corresponding both to the $i-2^{th}$ and $i-1^{th}$ repetition periods is "Short pulse detected";

delaying the stored information by time delays respectively equal to the duration Tr of the repetition period and twice said duration 2Tr for making available at each moment information relative to the present $i^{th}$ repetition period and said delayed information relative to the $i-1^{th}$ and to the $i-2^{th}$ repetition periods; and transmitting, for the subsequent processing of the signal, the delayed components $a_{i-1\,j}$ and $b_{i-1\,j}$ instead of the components $a_{ij}$ and $b_{ij}$ when the information is "Short pulse detected" and the delayed information is "No short pulse" for both the $i-1^{th}$ and $i-2^{th}$ repetition periods and transmitting the components $a_{ij}$ and $b_{ij}$ in all the other cases.

2. In a pulse Doppler radar, the pulse repetition period of which is divided into N range gates and which comprises receiving means for providing components $a_{ij}$ and $b_{ij}$ of the sample $\vec{V}_{ij}$ of the signal vector received during the $j^{th}$ range gate of the $i^{th}$ repetition period to signal processing means, an arrangement for eliminating short pulses comprising:

memory means for delaying phase component $a_{ij}$ and quadrature component $b_{ij}$ by a time delay equal to the duration Tr of said repetition period;

switching means having first inputs connected to said receiving means for receiving said components $a_{ij}$ and $b_{ij}$, second inputs being connected to said memory means for receiving said delayed components $a_{i-1\,j}$ and $b_{i-1\,j}$, a control input and outputs being connected to said processing means for delivering either said components or said delayed components based on said control input;

a modulus calculator having four inputs for receiving components $a_{ij}$ and $b_{ij}$ and delayed components $a_{i-1\,j}$ and $b_{i-1\,j}$ and an output for delivering the square $\Delta\rho_{ij}^2$ of the modulus of the vector $$\Delta\vec{V}_{ij}=\vec{V}_{ij}-\vec{V}_{i-1\,j}$$

which is the difference between the received signal vector and the signal vector received in the same range gate during the preceding repetition period;

a first memory for delaying said square of the modulus by a time delay equal to said duration Tr;

a decision circuit having first inputs connected to said modulus calculator and to said first memory for receiving said square of modulus $\Delta\rho_{ij}^2$ and said delayed square of the modulus $\Delta\rho_{i-j\,j}^2$, a first output for delivering an information "No short pulse" $PIB_{ij}=0$ or an information "Short pulse detected" $PIB_j=1$, second inputs for receiving said information relative to the two preceding repetition periods $PIB_{i-1\,j}$ and $PIB_{i-2\,j}$, and a controlling output connected to said control input of said switching means, said decision circuit delivering an information "No short pulse" $PIB_{ij}=0$, when the inequalities $$\Delta\rho^2{}_{i-1\,j} - K \leq \Delta\rho_{ij}{}^2 < \Delta\rho^2{}_{i-1\,j} + K$$

are satisfied (K being a noise threshold), or if they are not satisfied, when the delayed information relative to the two preceding repetition periods is "Short pulse detected"

$$PIB_{i-1\,j} = PIB_{i-2\,j} = 1,$$

and an information "Short pulse detected" $PIB_{ij}=1$ when said inequalities are not satisfied and the information relative to the i-2th repetition period is "No short pulse" $PIB_{i-2\,j}=0$, said decision circuit delivering at said controlling output control signals for said switching means to deliver said delayed components $a_{i-1\,j}$ and $b_{i-1\,j}$ when said information is "Short pulse detector", $PIB_{ij}=1$, and said delayed information is "No short pulse" for both preceding repetition periods, $$PIB_{i-1\,j} = PIB_{i-2\,j} = 0$$

and to deliver said undelayed components $a_{ij}$ and $b_{ij}$ in all the other cases; and second and third memories connected in series to said first output of said decision circuit for delaying said information $PIB_{ij}$ by time delays equal respectively to said duration Tr and to twice said duration so as to provide said delayed information $PIB_{i-1\,j}$ and $PIB_{i-2\,j}$ to said second inputs of said decision circuit.

3. A device according to claim 2, wherein said decision circuit comprises:

an adding circuit for adding said noise threshold K and said delayed square of the modulus $\Delta\rho_{i-1\,j}{}^2$;

a subtracting circuit for subtracting said noise threshold K from said delayed square of the modulus $\Delta\rho_{i-1\,j}{}^2$;

a first comparator having a first input receiving said square of the modulus $\Delta\rho_{ij}{}^2$, a second input connected to said adding circuit and an output for delivering a signal when said square of the modulus $\Delta\rho_{ij}{}^2$ is greater than the sum provided by said adding circuit;

a second comparator having a first input receiving said square of the modulus $\Delta\rho_{ij}{}^2$, a second output connected to said subtracting circuit and an output for delivering a signal when said square of the modulus $\Delta\rho_{ij}{}^2$ is smaller than the difference provided by said subtracting circuit; and a logic circuit having first inputs connected to said first and second comparators, a first output for furnishing said information $PIB_{ij}$, second inputs for receiving said delayed information $PIB_{i-1\,j}$ and $PIB_{i-2\,j}$ and a controlling output for delivering a control signal when one of said comparators furnishes a signal and the condition $$PIB_{i-1\,j} = PIB_{i-2\,j} = 0$$

are satisfied.

* * * * *